No. 883,696. PATENTED APR. 7, 1908.
G. P. CARROLL.
HYDRAULIC AIR AND GAS COMPRESSOR.
APPLICATION FILED NOV. 1, 1907.
6 SHEETS—SHEET 2.
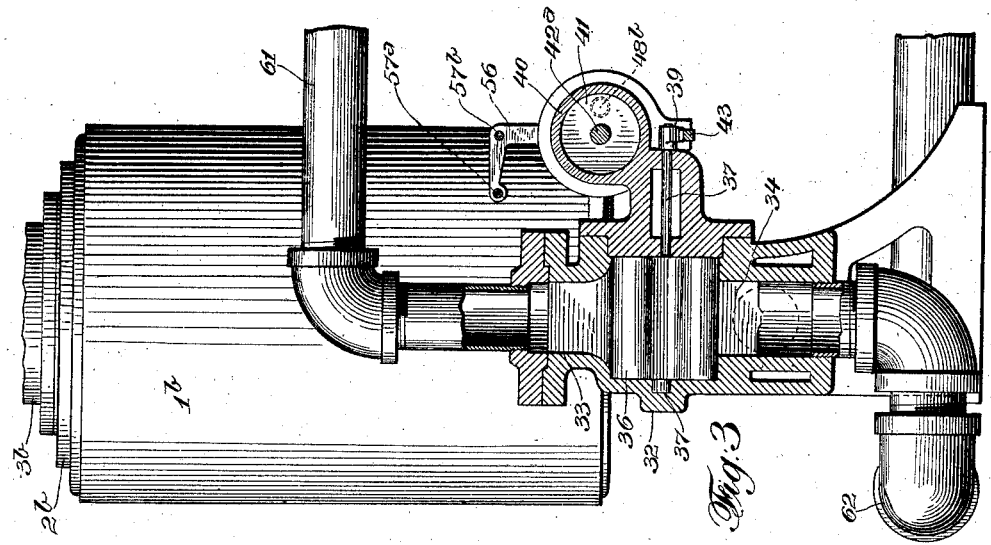

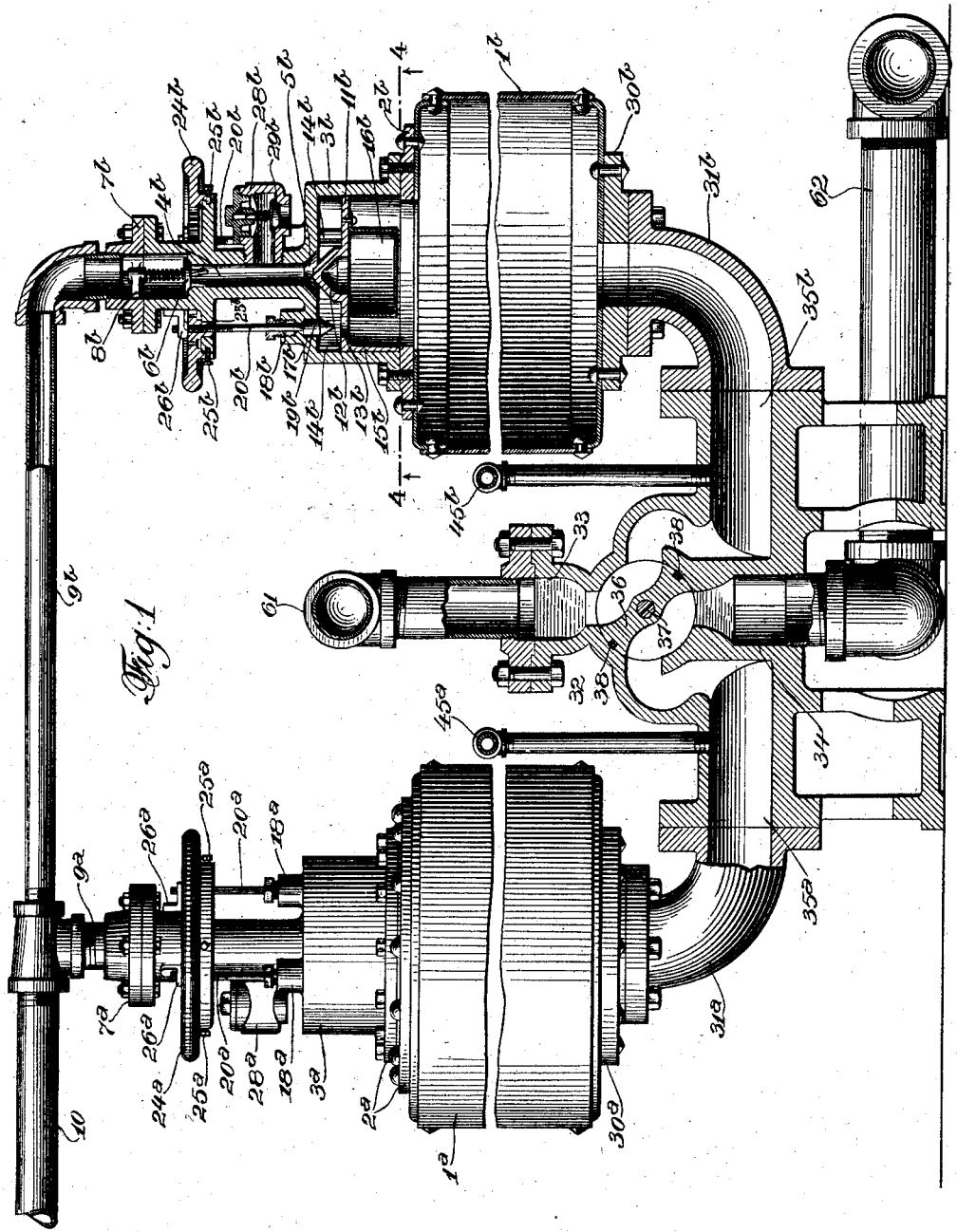

No. 883,696. PATENTED APR. 7, 1908.
G. P. CARROLL.
HYDRAULIC AIR AND GAS COMPRESSOR.
APPLICATION FILED NOV. 1, 1907.
6 SHEETS—SHEET 3.
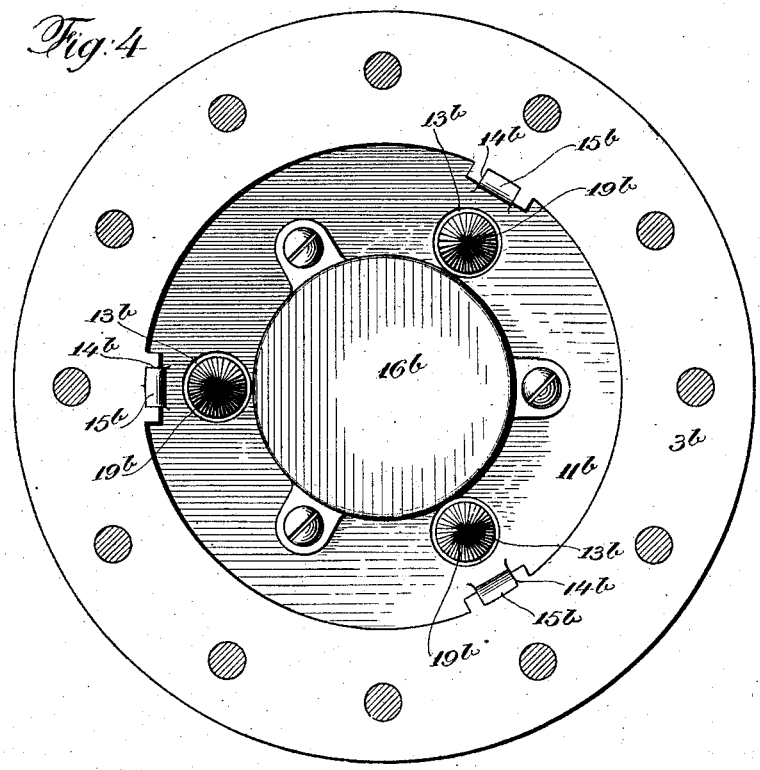
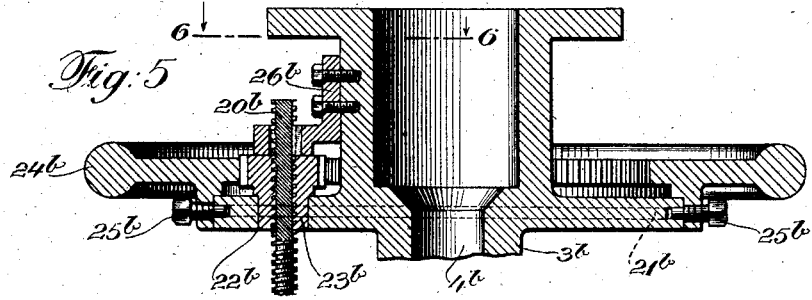
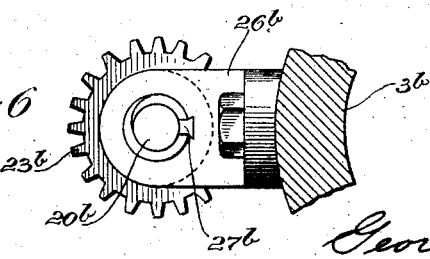
Witnesses
Inventor
George P. Carroll No. 883,696. PATENTED APR. 7, 1908.
G. P. CARROLL.
HYDRAULIC AIR AND GAS COMPRESSOR.
APPLICATION FILED NOV. 1, 1907.
6 SHEETS—SHEET 4.
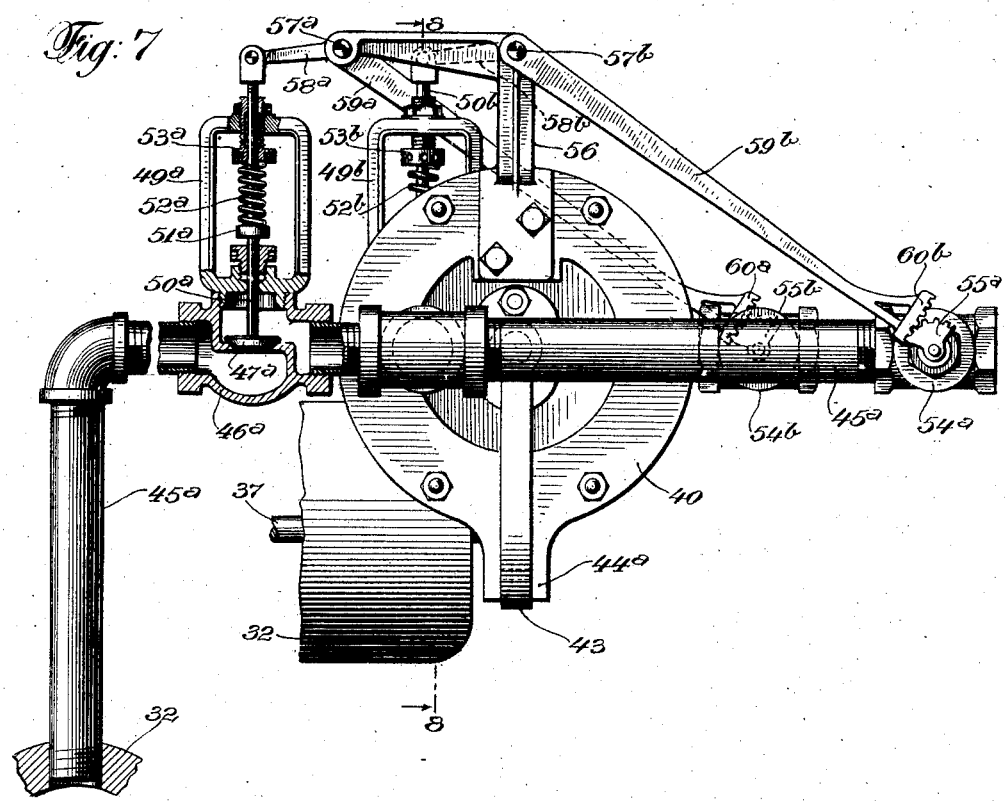
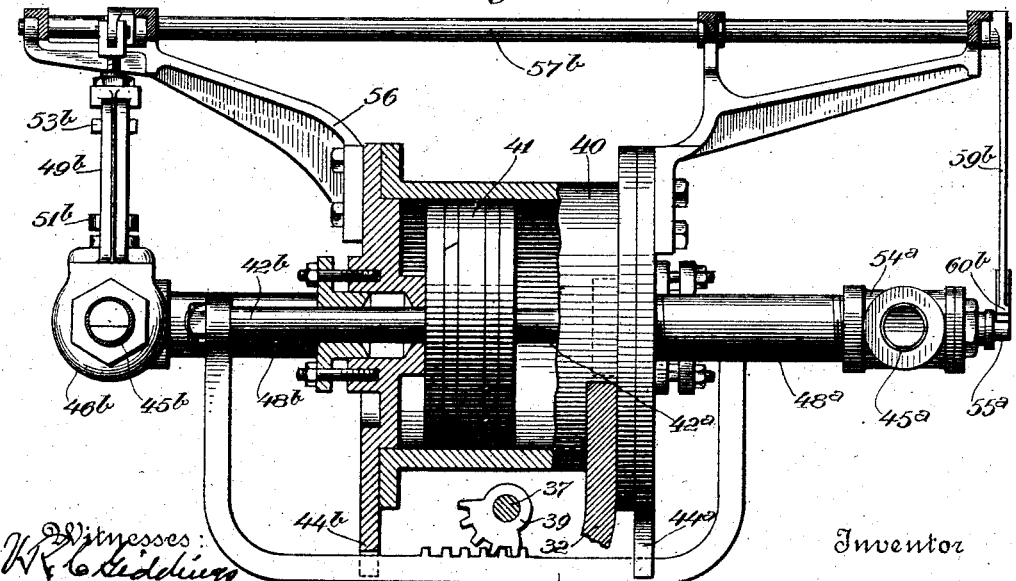

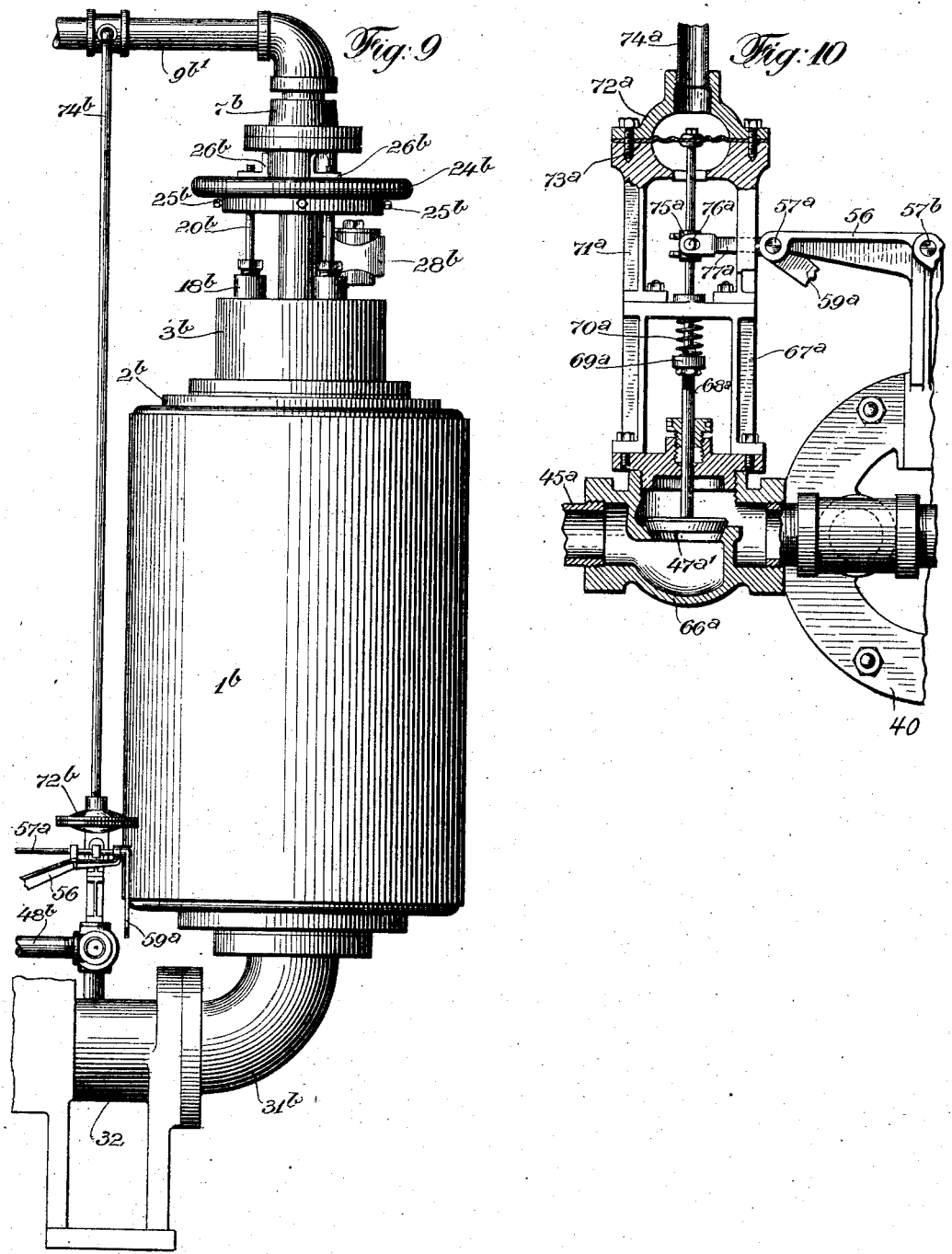

No. 883,696. PATENTED APR. 7, 1908.
G. P. CARROLL.
HYDRAULIC AIR AND GAS COMPRESSOR.
APPLICATION FILED NOV. 1, 1907.

6 SHEETS—SHEET 6.

Witnesses:

Inventor
George P. Carroll

UNITED STATES PATENT OFFICE.

GEORGE P. CARROLL, OF BRIDGEPORT, CONNECTICUT.

HYDRAULIC AIR AND GAS COMPRESSOR.

No. 883,696.  Specification of Letters Patent.  Patented April 7, 1908.

Application filed November 1, 1907. Serial No. 400,154.

*To all whom it may concern:*

Be it known that I, GEORGE P. CARROLL, a citizen of the United States, residing at Bridgeport, in the county of Fairfield and State of Connecticut, have invented a new and useful Hydraulic Air and Gas Compressor, of which the following is a specification.

My invention relates to improvements in hydraulic machines for the compression of air and other gases without the employment of piston rods or pistons in the compressor cylinders. It is intended to afford an apparatus safe from certain dangers and of simple and economical construction. It dispenses with the necessity of the usual water jackets. In addition to two vertical cylinders having inlet and outlet check valves and a four way distributing valve connected with each cylinder, the means employed are a float and gas accelerated check valve in each cylinder for closing the outlet of the cylinder filling up with liquid so that the increased pressure of the liquid opens a spring pressed check valve in connection with such cylinder and actuates a reversing device so as to shift the distributing valve. There are also novel details of construction as will appear. Unless otherwise expressed the word "gas" as used in the description and claims is to be understood to include air.

Figure 11:
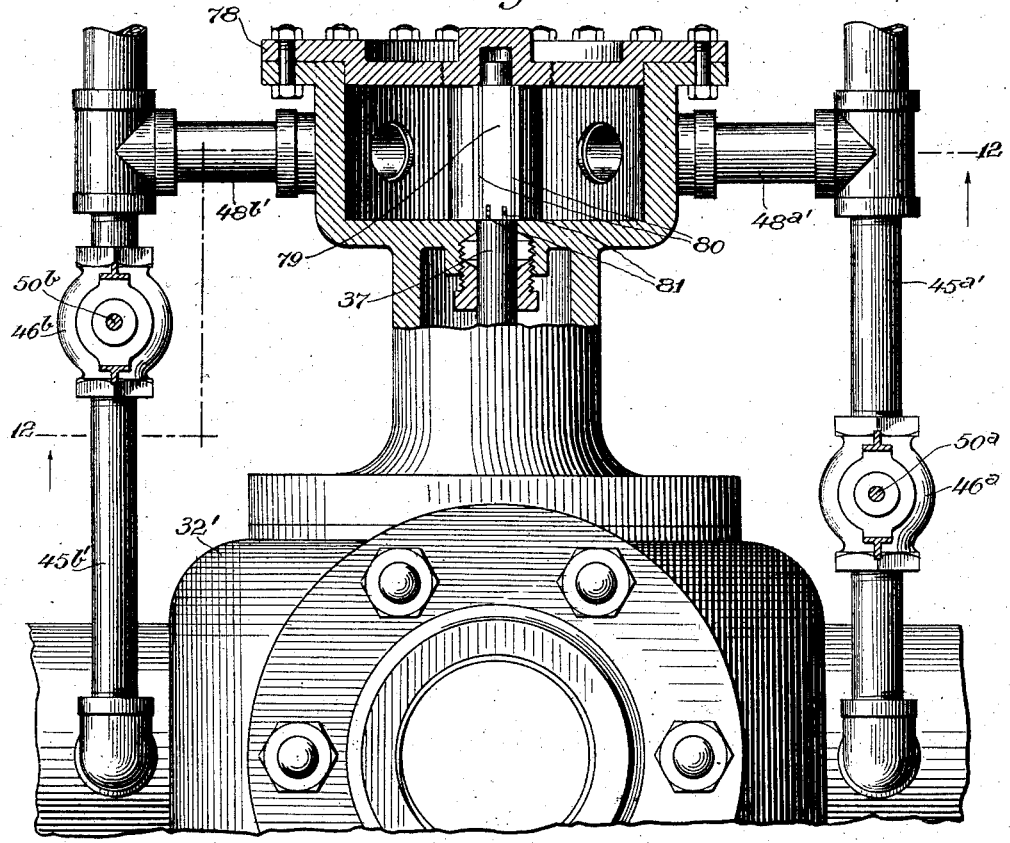
Figure 12:
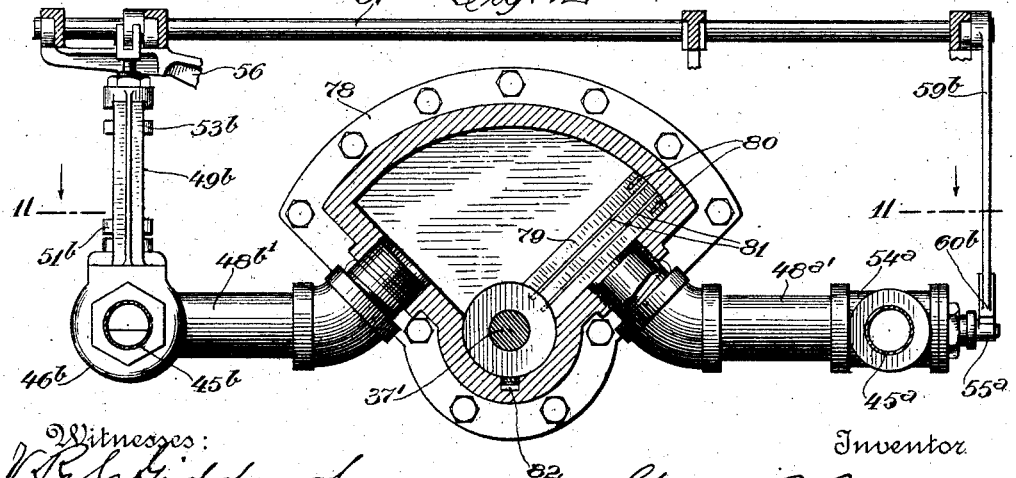

In the drawings Figure 1 is a partial front elevation and a partial vertical section of my invention through the line 1—1 of Fig. 2. Fig. 2 is a partial plan view and a partial horizontal section of the same structure. Fig. 3 is a vertical section through the line 3—3 of the preceding figure. Fig. 4 is a detail view from beneath through the line 4—4 of Fig. 1. Fig. 5 is a detail vertical section through the line 5—5 of Fig. 2. Fig. 6 is an enlarged detail plan view, partly in horizontal section, through the line 6—6 of the preceding figure. Fig. 7 is a detail elevation, partially in vertical section, of a shifting device as seen from the lower part of the sheet having Fig. 2. Fig. 8 is a partial vertical section and a partial back elevation of the same device through the line 8—8 of the preceding figure. Fig. 9 shows the connections of an alternative construction of a check valve as seen from the front of Fig. 2. Fig. 10 shows the alternative construction of said check valve as seen from the same point of view as Fig. 7. Fig. 11 is a partial plan view and a partial horizontal section through the line 11—11 of Fig. 12 of an alternative construction in place of the piston device of Fig. 8. Fig. 12 is a partial back elevation and a partial vertical section through the line 12—12 of the preceding figure.

Considering first Figs. 1 to 8 inclusive: Two chambers $1^a$ and $1^b$, preferably of vertical cylindrical form, are similar in all respects so that the description of the parts of one applies to the like numbered parts of the other. The chamber $1^b$ has an annular plate $2^b$ bolted to its top annular wall. The openings in the plate and wall are of the same diameter. Bolted to the annular plate is a vertical cylindrical top $3^b$ having an axially central upper outlet $4^b$. The superimposed top is usually of much less diameter than the chamber underneath. But the internal diameter of the top is of slightly greater diameter than that of its adjacent plate so as to form a narrow annular ledge on the upper side of the plate. The lower end of the outlet is enlarged to form a conical valve seat $5^b$. The upper end of the outlet is enlarged to hold and to form a conical seat for a spring pressed outwardly opening check valve $6^b$. Bolted to the top is an annular cap $7^b$, containing a perforated central bracket $8^b$ serving as a guide for the spindle of the valve $6^b$ and against which its spring abuts at its upper end. The bracket is perforated both to guide the spindle and also for the upward passage of gas. Pipe connections $9^a$ and $9^b$ lead from the caps $7^a$ and $7^b$ and unite in a common delivery pipe 10.

Occupying and reciprocating in the top $3^b$ is a flanged float valve $11^b$, having a hollow conical plug $12^b$ adapted to close the outlet $4^b$ when seated on the seat $5^b$. The flanged part of the valve below and annularly surrounding the plug has one or more, say three, openings $13^b$, whose aggregate area is much less than the cross section area of the liquid inlet into the chamber from beneath as will be described. But the aggregate area of these openings is greater than the cross section area of the corresponding outlet $4^b$. One or more, say three, longitudinal grooves $14^b$ are cast as a part of the top on its inside. Sliding in these grooves are corresponding guides $15^b$ joined at their upper ends to the circumference of the flange and adapted at their lower ends to rest on the ledge of the plate $2^b$ for support. Tightly secured and forming a part of the under part of the float valve within the circle of its openings $13^b$ is a hollow cylindrical cup $16^b$. The material and construction of the float valve is such that it normally rests on the plate $2^b$ by means of the lower end of its guides so as to leave a free passage through the openings $13^b$ and the valve seat $5^b$; but when the liquid rises in the chamber the valve $11^b$ is lifted and floats on the liquid and tends to close the valve seat. When the plug $12^b$ occupies the valve seat there is still a little space between the top of the flange and the under side of the adjacent top wall of the top $3^b$.

Of equal number and in axial alinement with the openings $13^b$ there are openings $17^b$ in the upper wall of the top 3 passing through bosses $18^b$ provided with stuffing boxes. In each opening is a depending stopper $19^b$ cylindrical for that part of its length which occupies the opening when the stopper is in its highest position as in Fig. 1 and conically pointed at its lower end. Where each opening passes through its boss, just above the position of the stopper when elevated to its highest position, the opening is of much less diameter so that a spindle $20^b$, threaded at its top, passes through the boss and stuffing box and is secured to the stopper $19^b$ as a head. Each stopper can then be positioned in a predetermined lower position so as to partially close the opening $13^b$ beneath it when the float valve is lifted to a certain height and to partially or wholly close, as may be desired, such opening when the valve plug $12^b$ occupies its seat.

The upper part of the top $3^b$ is flanged and has a groove $21^b$ (see Fig. 5) running around the outside of the flange. In the flange are openings $22^b$ corresponding in number and in axial alinement with the openings $17^b$ and $13^b$. Fitting into each opening $22^b$ are pinion nuts $23^b$ having shoulders resting on the flange and gears above the shoulders; and the nuts are internally threaded for their lengths so as to contain and engage with the threaded ends of the spindles $20^b$. An internally threaded hand wheel $24^b$ surrounds the top above its flange and meshes with the pinion nuts $23^b$. Depending from the under side of the hand wheel is a ring projection through which are horizontally inserted say four bolts $25^b$, threaded near their heads but unthreaded at their inner ends so as to travel around in the groove $21^b$ when the hand wheel is rotated. By this means the internal gearing of the hand wheel is kept enmeshed with the pinion nuts. Bolted to the top above the hand wheel are brackets $26^b$ equal in number and having openings in axial alinement with the pinion nuts $23^b$ and the spindles $20^b$. These brackets hold the pinion nuts in position upon the flange of the top $3^b$. Each bracket and each spindle is longitudinally slotted for the insertion of a feather $27^b$, which is held by the bracket (see Fig. 6), to cause the spindle to raise or depress its stopper $19^b$ when the hand wheel rotates the pinion nut.

Threaded into the top $3^b$ so as to connect with the passage $4^b$ below the seat of the outlet check valve $6^b$ is an inlet cage $28^b$ in which is placed an inwardly opening spring pressed check valve $29^b$. As shown this check $16^a$ opens from the atmosphere. Obviously this check valve and the corresponding check valve for the chamber $1^a$ may both lead from a common inlet pipe belonging to a closed gas circuit.

Bolted to the bottom wall of the chamber $1^b$ is an annular plate $30^b$ to which is bolted an elbow $31^b$. Between this and the corresponding elbow $31^a$ and bolted to them is a distributing valve chamber 32, having an inlet 33 from above, an outlet 34 directly underneath and two-way ports $35^a$ and $35^b$ respectively connected with the elbows $31^a$ and $31^b$. Connecting with the inner ends of the inlet, outlet and two-way ports is a slightly tapering but otherwise cylindrical enlargement in which is positioned a rotary distributing valve 36 secured to a shaft 37, which is journaled in the back wall and passes through and is journaled in the front wall of the valve chamber, preferably with ball bearings. When the valve is exactly vertical the inlet 33 and the outlet 34 are both closed. In other positions the valve is adapted to transmit liquid under pressure from the inlet into one chamber $1^a$ or $1^b$ while transmitting exhaust liquid from the other chamber through the outlet. The valve is provided with spring-pressed packing strips 38 to prevent leakage between the high pressure and the low pressure sides of the valve. To the end of the shaft 37 projecting from the front of the chamber 32 is secured a gear segment 39 (see Fig. 8).

In front of the chamber 32 with its axis horizontal but transverse to the axis of the chamber is a cylinder 40, containing a reciprocating piston 41. Through stuffing boxes in the end of the cylinder, piston rods $42^a$ and $42^b$ attached to opposite sides of the piston pass into the atmosphere and have bolted to their outer ends the upwardly bowed ends of a rack 43, which is guided by slots $44^a$ and $44^b$ in the extended heads of the cylinder so as to be always guided and kept in engagement with the gear segment 39. As the piston is forced back and forth it acts through its piston rods, the rack 43, the gear segment 39 and the shaft 37 to rotate the valve 36.

From the chamber 32 between its central enlargement and the outer ends of the two-way ports $35^a$ and $35^b$ respectively proceed pipes $45^a$ and $45^b$ (see Fig. 2) in which are placed check valve chambers $46^a$ and $46^b$, similar in all respect, so that the description of one and its connected parts applies to the like numbered parts and connections of the other. In the chamber 46ª a check valve 47ª opens outwardly (see Fig. 7). Just beyond the check valve chamber 45ª a pipe 48ª proceeds from the pipe 45ª into one end of the cylinder 40; and just beyond the check valve chamber 46ᵇ a pipe 48ᵇ proceeds from the pipe 45ᵇ into the other end of the cylinder 40. Closing the top of the check valve chamber 46ª is a casing 49ª, the bottom of which is provided with a stuffing box through which passes a spindle 50ª secured at its lower end to the check valve 47ª. Secured to the spindle above the stuffing box is a collar 51ª against the top of which the lower end of a strong coiled spring 52ª abuts. Within the threaded top of the casing is a correspondingly threaded nut 53ª adapted for longitudinal adjustment, against the under side of which the coiled spring 52ª abuts and through which the spindle 50ª is free to pass.

In the pipe 45ª beyond the departure of the pipe 48ª is placed a rotary relief valve 54ª, having a shaft passing out externally from the chamber containing the valve. To the outer end of the shaft is secured a gear segment 55ª. Bolted to the cylinder 40 is a frame 56 having bearings for the passage of shafts 57ª and 57ᵇ. Near one end of the shaft 57ª is secured a short lever 58ª, pivotally connected at its outer end to the extreme top of the spindle 50ª. To the other end of the shaft 57ª is secured a long lever 59ª, having at its outer end a small gear segment 60ª meshing with the gear segment 55ᵇ. When the check valve 47ª is opened by pressure on its under side, overcoming the spring 52ª, its spindle 50ª acts on the short lever 58ª, the shaft 57ª, the long lever 59ª, the gear segment 60ª, and the gear segment 55ᵇ to open the relief valve 54ᵇ and thus to permit of exhaust liquid escaping from the side of the piston 41 opposite to that against which high pressure liquid is being admitted. The effect of opening of the check valve in the check valve chamber 46ᵇ in opening the relief valve 54ª is precisely similar.

A high pressure pipe 61 leads into the inlet 33 and from the outlet 34 an exhaust pipe leads into a tank 63, into which the pipes 45ª and 45ᵇ flow after uniting. From the tank a triplex power pump 64, such as is preferred for the moderate or high pressures, forces liquid into the pipe 61. This pump may be driven by an electric moter 65 or otherwise.

In the remaining figures the same numbers are applied to parts which are the same as in the preceding figures. Next considering the alternative structure of Figs. 9 and 10, bolted to and closing the top of the check valve chamber 66ª, having the same position in the apparatus as the check valve chamber 46ª of the preceding figures, is a lower casing 67ª, consisting of two parts bolted together, the bottom part of which is provided with a stuffing box through which passes a spindle 68ª also passing through and guided by the top of the frame and secured at its lower end to the check valve 47ª′. Secured to the spindle between the top of the lower casing and the stuffing box is an adjustable collar 69ª against the top of which the lower end of a slight coiled spring 70ª abuts, while the top of the spring abuts against the under side of the top of the casing. Bolted to the top of the lower casing is an upper casing 71ª surmounted by a diaphragm chamber 72ª containing a flexible or resilient diaphragm 73ª. The top of the spindle 68ª passes through the center of the diaphragm and is secured to it by a suitable nut and washers. The bottom of the diaphragm chamber may be open to the atmosphere as shown or may be provided with a stuffing box. In the drawing the diaphragm 73 is shown as having a much larger area than the valve 47ª′. In practice the area of the diaphragm exposed to the action of gas from the pipe 74ª and the under side of the valve 47ª′ exposed to the action of liquid from the pipe 45ª are made substantially equal. The top of the diaphragm chamber is connected by a small pipe 74ª with the pipe 9ᵇ′ or any other part of the apparatus from which the compressed gas can be lead to the upper side of the diaphragm. Between the diaphragm chamber 72ª and the top of the lower casing 67ª is adjustably secured by set screws a collar 75ª having pins 76ª on opposite sides. Pivoted at its outer forked ends on these pins is a forked short lever 77ª secured to the shaft 57ª. The action through this short lever on the relief valve 54ᵇ is the same as before.

Finally considering Figs. 11 and 12, the structure here shown may be used as a modification of the structure of Figs. 1 to 8 inclusive, either as modified by Figs. 9 and 10 or as first described, in place of the cylinder 40 and its immediate connections. The shaft 37′ extends from the distributing valve chamber 32′ through its front wall and through a quadrantal piston chamber 78, into opposite sides of which lead pipes 48ª′ and 48ᵇ′ from the pipes 45ª and 45ᵇ respectively. Secured to the shaft 37′ which passes through the lower part of the chamber, by a cylindrical sleeve is a rotary piston 79 provided with spring pressed packing strips 80 at its top and similar strips 81 on one side. A spring pressed packing strip 82 in the lower wall of the chamber also bears against the sleeve of the piston. As the piston is forced either way in the chamber by liquid under pressure from the pipes 48ª′ and 48ᵇ′, it rotates the valve 36 in precisely the same way as the gear segment 39; and the exhaust liquid flows through the relief valve 54ª or 54ᵇ as the case may be.

The method of operation is as follows: Where air is to be compressed the motive liquid may be clear water or it may be water containing say two and one half per cent. of glycerin to decrease its friction. Where the machine is used as a part of the refrigerating system for the compression of ammonia gas, the motive liquid should be lubricant mineral oil of low cold test; and the entire circulatory system should be exhausted of air by a vacuum pump before introducing the oil. In either case the supply of motive liquid is introduced into the tank 63. If the structure of Fig. 7 is used, the spring $52^a$ is so adjusted that the check valve $47^a$ will not open until there is applied to its under side, per square inch of surface exposed, a pressure a little in excess of the pressure exerted by a column of liquid, water or oil as the case may be, of an inch area and of height equal to the difference between the height of the valve seat $5^b$ and the check valve $47^a$ plus the maximum pressure per square inch desired to be maintained in the delivery pipe 10 and beyond. But if the structure of Fig. 10 is used, the pressure to be maintained in the delivery pipe 10 or beyond is ignored, as it is exerted both above and below the valve; and the spring $70^a$ is adjusted to resist simply the pressure of the liquid and to open when that pressure is slightly exceeded.

With the valve 36 in the position shown in Fig. 1, as the pump 64 is started, liquid is forced into the chamber $1^b$, compressing and forcing the gas out past the check valve $6^b$ and keeping the check valve $29^b$ closed. Simultaneously liquid is ebbing from the chamber $1^a$ and gas is being admitted through its inlet check valve so as to eventually fill the chamber. In the chamber $1^b$ when the liquid has risen high enough to lift the float valve $11^b$ slightly, it brings the openings $13^b$ around the depending stoppers $19^b$ so as to be partially closed. The rising liquid now continues to lift the valve and also to compress the gas, above the surface of the liquid, that is now prevented from escaping through the openings. The tension of this confined gas, constantly becoming greater and greater than the tension of the gas above the float valve, powerfully accelerates the action of the liquid in closing the valve. The force exerted in finally closing the valve is both strong and elastic, its elasticity resulting both from the buoyancy of the valve and from the compressibility of the gas. With the stoppers $19^b$ in proper longitudinal adjustment by a turning of the hand wheel $24^b$ sufficiently to the right or left, a minimum of residual gas will be left on the under side of the float valve and no liquid will have past above the valve seat $5^b$. But a little liquid rising above the valve seat will do no harm, as it will fall back when the float valve drops. So even if the liquid rises above the outlet check valve $6^b$, it will flow back when the check valve opens on the next rise of liquid in the chamber.

When the float valve $11^b$ closes the outlet $4^b$ for an instant the inflowing liquid compresses the residual gas to its final limit. Then the pressure of the liquid on the walls of the chamber and its inflow connection is rapidly approximating the maximum attainable by the pump. But this rising pressure forthwith opens the check valve $47^b$ and admits liquid to the reciprocating piston 41 or the rotary piston 79, depending on whether the structure of Figs. 2, 7 and 8 or of Figs. 11 and 12 is used. The rotary valve 36 is immediately reversed so as to admit liquid under pressure into the chamber $1^a$ and to emit it from the chamber $1^b$. In shifting the piston 41 or 79, the residual gas below the float valve $11^b$ acts as a spring in thrusting the liquid against the piston; and the check valve $47^b$ remains open until the piston has been sufficiently shifted and the rotary valve has begun to reverse its inlet and outlet discharges. As the liquid falls in the chamber $1^b$, the float valve $11^b$ drops so that its guides $15^b$ again rest on the ledge of the plate $2^b$; the check valve $6^b$ drops to its seat and prevents any back flow of compressed gas; and the check valve $29^b$ opens to admit uncompressed gas. The other half of the cycle of operation, in which compressed gas is expelled from the chamber $1^a$, is precisely similar.

If the stoppers $19^b$ and the cup $16^b$ were eliminated, leaving openings $13^b$ sufficiently smaller than the liquid inlet passage ending in the annular plate $30^b$, the valve plug $12^b$ might be seated by liquid pressure directly and exclusively. But such a closing of the outlet $4^b$ would be with a violent shock, owing to the incompressibility of the motive liquid, affecting prejudicially the durability of the machine; and liquid would be apt to spurt far above the outlet check valve $6^b$ so as to interfere with the proper operation of the system. On the other hand with a simple float valve having free passages through and around it for the passage of gas until its seating, the closing would be feeble and uncertain, owing to the tendency of the valve to bob up and down in the liquid. This also would permit of liquid shooting up beyond the outlet check valve $6^b$; and there would be a great liability that the upward rush of liquid would prevent the seating of the valve, causing liquid to fill the delivery pipe 10, and beyond, and preventing pressure being generated to open the check valve $47^b$.

With the usual high speed mechanically actuated piston compressor a water jacket is necessary to remove the heat of compression. And with an air compressor an insufficiency of cooling water flowing through such a jacket is especially dangerous. For if the oil lubricating the piston becomes too hot it will gasify and the piston and cylinder may then generate enough heat to ignite the gas and by the consequent explosion to wreck the machine. There is also a rigidity in a piston compressor that lessens its economy of operation. In my machine all such danger of explosion is made impossible, the slow moving pump plungers are constantly lubricated by the liquid they are pumping, and the compression of the gas is accommodated to the movement of the pump plungers. As the compression is slow, quite a considerable part of the heat radiates into the atmosphere; but most of the heat passes into the motive liquid. The liquid is carried into the tank 63 and there cools down to atmospheric temperature or thereabouts. The cost of construction of the entire apparatus is much less then that of a mechanically driven piston compressor of equal capacity.

To secure the greatest economy the cylinders 1ª and 1ᵇ should be made as large as practicable in proportion to their inlet and outlet connections and to the other parts of the apparatus. And these cylinders can best be made of boiler iron or even of cement or concrete construction.

I claim:

1. In combination a chamber having an outlet, a valve positionable either to admit liquid under pressure into said chamber so as to expel gas contained therein through said outlet or to emit liquid from said chamber, means for positioning said valve so as to admit such liquid into said chamber after liquid has been emitted therefrom, means automatically operative to close said outlet when said chamber has been substantially so filled with liquid, means actuated in opposition to a constant pressure by the increased pressure of the liquid caused by the closing of said outlet so as to shut off the further supply of liquid and to position said valve so as to emit liquid from said chamber, means for keeping said outlet closed while liquid is being so emitted, and means for admitting gas into said chamber during such emission.

2. In combination two chambers each having an outlet, a valve positionable to admit liquid under pressure into each chamber in alternation so as to expel gas contained therein through its outlet while emitting liquid from the other chamber, means automatically operative to close the outlet of the chamber that has been substantially so filled with liquid, means actuated in opposition to a constant pressure by the increased pressure of the liquid caused by the closing of such outlet so as to shut off the further supply of liquid and to position said valve so as to admit liquid under pressure into the other chamber, means for keeping the outlet of each chamber closed while liquid is being emitted therefrom, and means for admitting gas into that chamber during such emission.

3. In combination a chamber having an outlet, a valve positionable either to admit liquid under pressure into said chamber so as to expel gas contained therein through said outlet or to emit liquid from said chamber, means for positioning said valve so as to admit such liquid into said chamber after liquid has been emitted therefrom, means automatically operative to close said outlet when said chamber has been substantially so filled with liquid, means actuated in opposition to a constant pressure by the increased pressure of the liquid caused by the closing of said outlet so as to shut off the further supply of liquid and to position said valve so as to emit liquid from said chamber, a first check valve for preventing a back flow of gas through said outlet while liquid is being emitted from said chamber, and a second check valve opening into said chamber.

4. In combination two chambers each having an outlet, a valve positionable to admit liquid under pressure into each chamber in alternation so as to expel gas contained therein through its outlet while emitting liquid from the other chamber, means automatically operative to close the outlet of the chamber that has been substantially so filled with liquid, means actuated in opposition to a constant pressure by the increased pressure of the liquid caused by the closing of such outlet so as to shut off the further supply of liquid and to position said valve so as to admit liquid under pressure into the other chamber, check valves for preventing a back flow of gas through the outlets of each chamber while liquid is being emitted therefrom, and other check valves opening into each chamber.

5. In combination a chamber having an outlet, a valve positionable either to admit liquid under pressure into said chamber so as to expel gas contained therein through said outlet or to emit liquid from said chamber, means for positioning said valve so as to admit such liquid into said chamber after liquid has been emitted therefrom, means automatically operative to close said outlet when said chamber has been substantially so filled with liquid, means actuated in opposition to an adjustable constant pressure by the increased pressure of the liquid caused by the closing of said outlet so as to shut off the further supply of liquid and to position said valve so as to emit liquid from said chamber, means for keeping said outlet closed while liquid is being so emitted, and means for admitting gas into said chamber during such emission.

6. In combination two chambers each having an outlet, a valve positionable to admit liquid under pressure into each chamber in alternation so as to expel gas contained therein through its outlet while emitting liquid from the other chamber, means automatically operative to close the outlet of the chamber that has been substantially so filled with liquid, means actuated in opposition to an adjustable constant pressure by the increased pressure of the liquid caused by the closing of such outlet so as to shut off the further supply of liquid and to position said valve so as to admit liquid under pressure into the other chamber, means for keeping the outlet of each chamber closed while liquid is being emitted therefrom, and means for admitting gas into that chamber during such emission.

7. In combination a chamber having an outlet, a valve positionable either to admit liquid under pressure into said chamber so as to expel gas contained therein through said outlet or to emit liquid from said chamber, means for positioning said valve so as to admit such liquid into said chamber after liquid has been emitted therefrom, means automatically operative to close said outlet when said chamber has been substantially so filled with liquid, means actuated in opposition to an adjustable constant pressure by the increased pressure of the liquid caused by the closing of said outlet so as to shut off the further supply of liquid and to position said valve so as to emit liquid from said chamber, a first check valve for preventing a back flow of gas through said outlet while liquid is being emitted from said chamber, and a second check valve opening into said chamber.

8. In combination two chambers each having an outlet, a valve positionable to admit liquid under pressure into each chamber in alternation so as to expel gas contained therein through its outlet while emitting liquid from the other chamber, means automatically operative to close the outlet of the chamber that has been substantially so filled with liquid, means actuated in opposition to an adjustable constant pressure by the increased pressure of the liquid caused by the closing of such outlet so as to shut off the further supply of liquid and to position said valve so as to admit liquid under pressure into the other chamber, check valves for preventing a back flow of gas through the outlets of each chamber while liquid is being emitted therefrom, and other check valves opening into each chamber.

9. In combination a chamber having an outlet, a distributing valve positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device positionable first to position said valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing of said outlet sufficiently to overcome the spring of said check valve, means for keeping said outlet closed while liquid is being so emitted, and means for admitting gas into said chamber during such emission.

10. In combination two chambers each having an outlet, a distributing valve positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device positionable to position said valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping such outlet closed while liquid is being so emitted, and means for admitting gas into such chamber during such emission.

11. In combination a chamber having an outlet, a distributing valve positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device positionable first to position said valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing of said outlet sufficiently to overcome the spring of said check valve, a second check valve for preventing a back flow of gas through said outlet while liquid is being emitted from said chamber, and a third check valve opening into said chamber.

12. In combination two chambers each having an outlet, a distributing valve positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device positionable to position said valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

13. In combination a chamber having an outlet, a distributing valve positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device positionable first to position said valve in its first position and secondly in its second position, means for positioning said shifting device in its first position, an adjustable spring pressed check valve connected with said chamber and operative to admit fluid under pressure to position said shifting device in its second position when the pressure of the liquid admitted into said chamber has been increased by such closing of said outlet sufficiently to overcome the spring of said check valve, means for keeping said outlet closed while liquid is being so emitted, and means for admitting gas into said chamber during such emission.

14. In combination two chambers each having an outlet, a distributing valve positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device positionable to position said valve in its alternate positions successively, adjustable spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping such outlet closed while liquid is being so emitted, and means for admitting gas into such chamber during such emission.

15. In combination a chamber having an outlet, a distributing valve positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device positionable first to position said valve in its first position and secondly in its second position, means for positioning said shifting device in its first position, an adjustable spring pressed check valve connected with said chamber and operative to admit fluid under pressure to position said shifting device in its second position when the pressure of the liquid admitted into said chamber has been increased by such closing of said outlet sufficiently to overcome the spring of said check valve, a second check valve for preventing a back flow of gas through said outlet while liquid is being emitted from said chamber, and a third check valve opening into said chamber.

16. In combination two chambers each having an outlet, a distributing valve positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device positionable to position said valve in its alternative positions successively, adjustable spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

17. In combination a chamber having an outlet, a shaft, a distributing valve secured to said shaft and positionable first to admit liquid under pressure into said chamber so as to expel gas contained therein through said outlet and secondly to shut off the further supply of such liquid and to emit liquid from said chamber, means automatically opera-tive to close said outlet when said chamber has been substantially so filled with liquid, a shifting device also secured to said shaft and positionable through the application of fluid under pressure first to position said valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing of said outlet sufficiently to overcome the spring of said check valve, means for keeping said outlet closed while liquid is being so emitted, and means for admitting gas into said chamber during such emission.

18. In combination two chambers each having an outlet, a shaft, a distributing valve secured to said shaft and positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device also secured to said shaft and positionable through the application of fluid under pressure to position said valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping such outlet closed while liquid is being so emitted, and means for admitting gas into such chamber during such emission.

19. In combination a chamber having an outlet, a shaft, a distributing valve secured to said shaft and positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device also secured to said shaft and positionable through the application of fluid under pressure first to position said valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing of said outlet sufficiently to overcome the spring of said check valve, a second check valve for preventing a back flow of gas through said outlet while liquid is being emitted from said chamber, and a third check valve opening into said chamber.

20. In combination two chambers each having an outlet, a shaft, a distributing valve secured to said shaft and positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device also secured to said shaft and positionable through the application of fluid under pressure to position said valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

21. In combination a chamber having an outlet, a shaft, a distributing valve secured to said shaft and positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device also secured to said shaft and positionable through the application of fluid under pressure first to position said valve in its first position and secondly in its second position, means for admitting fluid under pressure to position said shifting device in its first position, an adjustable spring pressed check valve connected with said chamber and operative to admit fluid under pressure to position said shifting device in its second position when the pressure of the liquid admitted into said chamber has been increased by such closing of said outlet sufficiently to overcome the spring of said check valve, means for keeping said outlet closed while liquid is being so emitted, and means for admitting gas into said chamber during such emission.

22. In combination two chambers each having an outlet, a shaft, a distributing valve secured to said shaft and positionable to admit liquid under pressure into said chamber in alternation so as to expel gas contained therein through its outlet while shutting off the further supply of liquid and emitting liquid from the other chamber, means automatically operative to close the outlet of the chamber that has been substantially so filled with liquid, a shifting device also secured to said shaft and positionable through the application of fluid under pressure to position said valve in its alternate positions successively, adjustable spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping such outlet closed while liquid is being so emitted, and means for admitting gas into such chamber during such emission.

23. In combination a chamber having an outlet, a shaft, a distributing valve secured to said shaft and positionable first to admit liquid under pressure into said chamber so as to expel gas contained therein through said outlet and secondly to shut off the further supply of such liquid and to emit liquid from said chamber, means automatically operative to close said outlet when said chamber has been substantially so filled with liquid, a shifting device also secured to said shaft and positionable through the application of fluid under pressure first to position said valve in its first position and secondly in its second position, means for admitting fluid under pressure to position said shifting device in its first position, an adjustable spring pressed check valve connected with said chamber and operative to admit fluid under pressure to position said shifting device in its second position when the pressure of the liquid admitted into said chamber has been increased by such closing of said outlet sufficiently to overcome the spring of said check valve, a second check valve for preventing a back flow of gas through said outlet while liquid is being emitted from said chamber, and a third check valve opening into said chamber.

24. In combination two chambers each having an outlet, a shaft, a distributing valve secured to said shaft and positionable to admit liquid under pressure into each chamber in alternation so as to expel gas contained therein through its outlet while shutting off the further supply of liquid and emitting liquid from the other chamber, means automatically operative to close the outlet of the chamber that has been substantially so filled with liquid, a shifting device also secured to said shaft and positionable through the application of fluid under pressure to position said valve in its alternate positions successively, adjustable spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

25. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid in said chamber to close said outlet, means actuated in opposition to a constant pressure by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

26. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid therein to close its outlet, means actuated in opposition to a constant pressure by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

27. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid in said chamber to close said outlet, means actuated in opposition to a constant pressure by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

28. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid therein to close its outlet, means actuated in opposition to a constant pressure by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

29. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the rise of liquid in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

30. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the rise of liquid therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

31. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the rise of liquid in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

32. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the rise of liquid therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

33. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the rise of liquid in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

34. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the rise of liquid therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

35. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the rise of liquid in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

36. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the rise of liquid therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into each chamber has been increased by the closing of its outlet sufficiently to overcome the spring of such check valve, other check valves for preventing a back flow of gas through the outlets of each chamber while liquid is being emitted therefrom, and still other check valves opening into each chamber.

37. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the compression of gas in said chamber to close said outlet, means actuated by the increased pressure of the liquid caused by the closing of said outlet so as to shut off the further supply of liquid and to position said distributing valve so as to emit liquid from said chamber, means for keeping said outlet closed while liquid is being emitted, and means for admitting gas into said chamber during such emission.

38. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the compression of gas therein to close its outlet, means actuated by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

39. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the compression of gas in said chamber to close said outlet, means actuated by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, a second check valve opening into said chamber.

40. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the compression of gas therein to close its outlet, means actuated by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

41. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the compression of gas in said chamber to close said outlet, means actuated in opposition to a constant pressure by the increased pressure of the liquid caused by the closing of said outlet so as to shut off the further supply of liquid and to position said distributing valve so as to emit liquid from said chamber, means for keeping said outlet closed while liquid is being emitted, and means for admitting gas into said chamber during such emission.

42. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the compression of gas therein to close its outlet, means actuated in opposition to a constant pressure by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

43. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the compression of gas in said chamber to close said outlet, means actuated in opposition to a constant pressure by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

44. In combination two chambers each having an outlet from its upper part, a distributing valve positionable to admit liquid under pressure into each chamber in alternation so as to expel gas contained therein through its outlet while emitting liquid from the other chamber, a valve in each chamber acuated by the compression of gas therein to close its outlet, means actuated in opposition to a constant pressure by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other chack valves opening into each chamber.

45. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the compression of gas in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

46. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the compression of gas therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

47. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the compression of gas in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

48. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the compression of gas therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

49. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the compression of gas in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

50. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the compression of gas therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

51. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the compression of gas in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

52. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the compression of gas therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

53. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid and accelerated by the compression of gas in said chamber to close said outlet, means actuated by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

54. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid and accelerated by the compression of gas therein to close its outlet, means actuated by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

55. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid and accelerated by the compression of gas in said chamber to close said outlet, means actuated by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

56. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid and accelerated by the compression of gas therein to close its outlet, means actuated by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

57. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid and accelerated by the compression of gas in said chamber to close said outlet, means actuated in opposition to a constant pressure by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

58. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid and accelerated by the compression of gas therein to close its outlet, means actuated in opposition to a constant pressure by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

59. In combination a chamber having an outlet from its upper part, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a valve actuated by the rise of liquid and accelerated by the compression of gas in said chamber to close said outlet, means actuated in opposition to a constant pressure by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

60. In combination two chambers each having an outlet from its upper part, a distributing valve positionable to admit liquid under pressure into each chamber in alternation so as to expel gas contained therein through its outlet while emitting liquid from the other chamber, a valve in each chamber actuated by the rise of liquid and accelerated by the compression of gas therein to close its outlet, means actuated in opposition to a constant pressure by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

61. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the rise of liquid and accelerated by the compression of gas in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

62. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the rise of liquid and accelerated by the compression of gas therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

63. In combination a chamber having an outlet from its upper part, a distributing valve positionable first to admit liquid under pressure into said chamber so as to expel gas contained therein through said outlet and secondly to shut off the further supply of such liquid and to emit liquid from said chamber, a valve actuated by the rise of liquid and accelerated by the compression of gas in said chamber to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

64. In combination two chambers each having an outlet from its upper part, a distributing valve positionable to admit liquid under pressure into each chamber in alternation so as to expel gas contained therein through its outlet while shutting off the further supply of liquid and emitting liquid from the other chamber, a valve in each chamber actuated by the rise of liquid and accelerated by the compression of gas therein to close its outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

65. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the rise of liquid and accelerated by the compression of gas in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

66. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the rise of liquid and accelerated by the compression of gas therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

67. In combination a chamber having an outlet from its upper part, a shaft, a distributing valve secured to said shaft and positionable first to admit liquid under pressure into said chamber so as to expel gas contained therein through said outlet and secondly to shut off the further supply of such liquid and to emit liquid from said chamber, a valve actuated by the rise of liquid and accelerated by the compression of gas in said chamber to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

68. In combination two chambers each having an outlet from its upper part, a shaft, a distributing valve secured to said shaft and positionable to admit liquid under pressure into each chamber in alternation so as to expel gas contained therein through its outlet while shutting off the further supply of liquid and emitting liquid from the other chamber, a valve in each chamber actuated by the rise of liquid and accelerated by the compression of gas therein to close its outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

69. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, means actuated by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

70. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, means actuated by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

71. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, means actuated by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

72. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through such opening before the flanged valve having such opening is lifted high enough to close its corresponding outlet, means actuated by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

73. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, means actuated in opposition to a constant pressure by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

74. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, means actuated in opposition to a constant pressure by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

75. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, means actuated in opposition to a constant pressure by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

76. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, means actuated in opposition to a constant pressure by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

77. In combination a chamber having a top and an outlet therefrom, a distributing valve positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

78. In combination two chambers each having a top and an outlet therefrom, a distributing valve positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

79. In combination a chamber having a top and an outlet therefrom, a distributing valve positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

80. In combination two chambers each having a top and an outlet therefrom, a distributing valve positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

81. In combination a chamber having a top and an outlet therefrom, a shaft, a distributing valve secured to said shaft and positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emissions.

82. In combination two chambers each having a top and an outlet therefrom, a shaft, a distributing valve secured to said shaft and positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

83. In combination a chamber having a top and an outlet therefrom, a shaft, a distributing valve secured to said shaft and positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, means for checking the flow of gas through said openings before said flanged valve is lifted high enough to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

84. In combination two chambers each having a top and an outlet therefrom, a shaft, a distributing valve secured to said shaft and positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, means for checking the flow of gas through each such opening before the flanged valve having such opening is lifted high enough to close its corresponding outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

85. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, means actuated by the increased pressure of the liquid caused by the closing of said outlet so as to shut off the further supply of liquid and to position said distributing valve so as to emit liquid from said chamber, means for keeping said outlet closed while liquid is being so emitted, and means for admitting gas into said chamber during such emission.

86. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, means actuated by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

87. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, means actuated by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

88. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of fluid in such chamber and lowered by the fall of such liquid, adjustable depending stoppers for checking the flow of gas through each such opening before the flanged valve having such opening is lifted high enough to close its corresponding outlet, means actuated by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

89. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, means actuated in opposition to a constant pressure by the increased pressure of the liquid caused by the closing of said outlet so as to shut off the further supply of liquid and to position said distributing valve so as to admit liquid from said chamber, means for keeping said outlet closed while liquid is being so admitted, and means for admitting gas into said chamber during such emission.

90. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, means actuated in opposition to a constant pressure by the increased pressure of the liquid caused by the closing of such outlet so as to shut off the further supply of liquid and to position said distributing valve so as to admit liquid under pressure into the other chamber, means for keeping the outlet of each chamber closed while liquid is being emitted therefrom, and means for admitting gas into that chamber during such emission.

91. In combination a chamber having a top and an outlet therefrom, a distributing valve positionable either to admit liquid under pressure into said chamber so as to expel gas contained therein through said outlet or to emit liquid from said chamber, means for positioning said valve so as to admit such liquid into said chamber after liquid has been emitted therefrom, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, means actuated in opposition to a constant pressure by the increased pressure of the liquid caused by the closing of said outlet so as to shut off the further supply of liquid and to position said distributing valve so as to emit liquid from said chamber, a first check valve for preventing a back flow of gas through said outlet while liquid is being emitted from said chamber, and a second check valve opening into said chamber.

92. In combination two chambers each having a top and an outlet therefrom, a distributing valve positionable to admit liquid under pressure into each chamber in alternation so as to expel gas contained therein through its outlet while emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, means actuated in opposition to a constant pressure by the increased pressure of the liquid caused by the closing of such outlet so as to shut off the further supply of liquid and to position said distributing valve so as to admit liquid under pressure into the other chamber, check valves for preventing a back flow of gas through the outlets of each chamber while liquid is being emitted therefrom, and other check valves opening into each chamber.

93. In combination a chamber having a top and an outlet therefrom, a distributing valve positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

94. In combination two chambers each having a top and an outlet therefrom, a distributing valve positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

95. In combination a chamber having a top and an outlet therefrom, a distributing valve positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, a shifting device positionable first to position said distributing valve in its first position and secondly in its second position, means for positioning said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

96. In combination two chambers each having a top and an outlet therefrom, a distributing valve positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, a shifting device positionable to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

97. In combination a chamber having a top and an outlet therefrom, a shaft, a distributing valve secured to said shaft and positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, means for keeping said outlet closed while liquid is being so emitted, and means for admitting gas into said chamber during such emission.

98. In combination two chambers each having a top and an outlet therefrom, a shaft, a distributing valve secured to said shaft and positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, means for keeping the outlet of each chamber closed while liquid is being emitted therefrom, and means for admitting gas into that chamber during such emission.

99. In combination a chamber having a top and an oulet therefrom, a shaft, a distributing valve secured to said shaft and positionable first to admit liquid under pressure into said chamber so as to expel gas contained therein through said outlet and secondly to shut off the further supply of such liquid and to emit liquid from said chamber, a flanged valve occupying and reciprocating in the top of said chamber, adapted to close said outlet, having in its flange openings for the passage of fluid, lifted by the rise of liquid in said chamber and lowered by the fall of such liquid, adjustable depending stoppers for checking the flow of gas through said openings before said flanged valve is lifted high enough to close said outlet, a shifting device also secured to said shaft and positionable through the application of fluid under pressure first to position said distributing valve in its first position and secondly in its second position, means for admitting fluid under pressure to position said shifting device in its first position, a spring pressed check valve connected with said chamber and operative to admit fluid under pressure to position said shifting device in its second position when the pressure of the liquid admitted into said chamber has been increased by such closing sufficiently to overcome the spring of said check valve, a second check valve for preventing a back flow of gas through said outlet while liquid is being emitted from said chamber, and a third check valve opening into said chamber.

100. In combination two chambers each having a top and an outlet therefrom, a shaft, a distributing valve secured to said shaft and positionable to admit liquid under pressure into each chamber in alternation so as to expel gas contained therein through its outlet while shutting off the further supply of liquid and emitting liquid from the other chamber, a flanged valve occupying and reciprocating in the top of each chamber, adapted to close the outlet of such chamber, having in its flange openings for the passage of fluid, lifted by the rise of liquid in such chamber and lowered by the fall of such liquid, adjustable depending stoppers for checking the flow of gas through each such opening before the flanged valve having such opening is lifted high enough to close its corresponding outlet, a shifting device also secured to said shaft and positionable through the application of fluid under pressure to position said distributing valve in its alternate positions successively, spring pressed check valves connected with each chamber each being operative to admit fluid under pressure to position said shifting device so as to position said distributing valve to shut off the further supply of liquid to its connected chamber when the pressure of the liquid admitted into such chamber has been increased by the closing of its outlet sufficiently to overcome the spring of such check valve, other check valves for preventing a back flow of gas through the outlets of each chamber while liquid is being emitted therefrom, and still other check valves opening into each chamber.

GEORGE P. CARROLL.

Witnesses:
ARTHUR M. MARSH,
CARL KAHN.